Dec. 2, 1952  F. W. MEREDITH  2,620,463
AUTOMATIC CONTROL SYSTEM
Filed June 11, 1948  3 Sheets-Sheet 1

INV.
FREDERICK WILLIAM MEREDITH.
By Moore & Hall
Attys.

Dec. 2, 1952     F. W. MEREDITH     2,620,463
AUTOMATIC CONTROL SYSTEM

Filed June 11, 1948     3 Sheets-Sheet 2

Fig.2.

INV.

FREDERICK WILLIAM MEREDITH

By Moore & Hall atty.

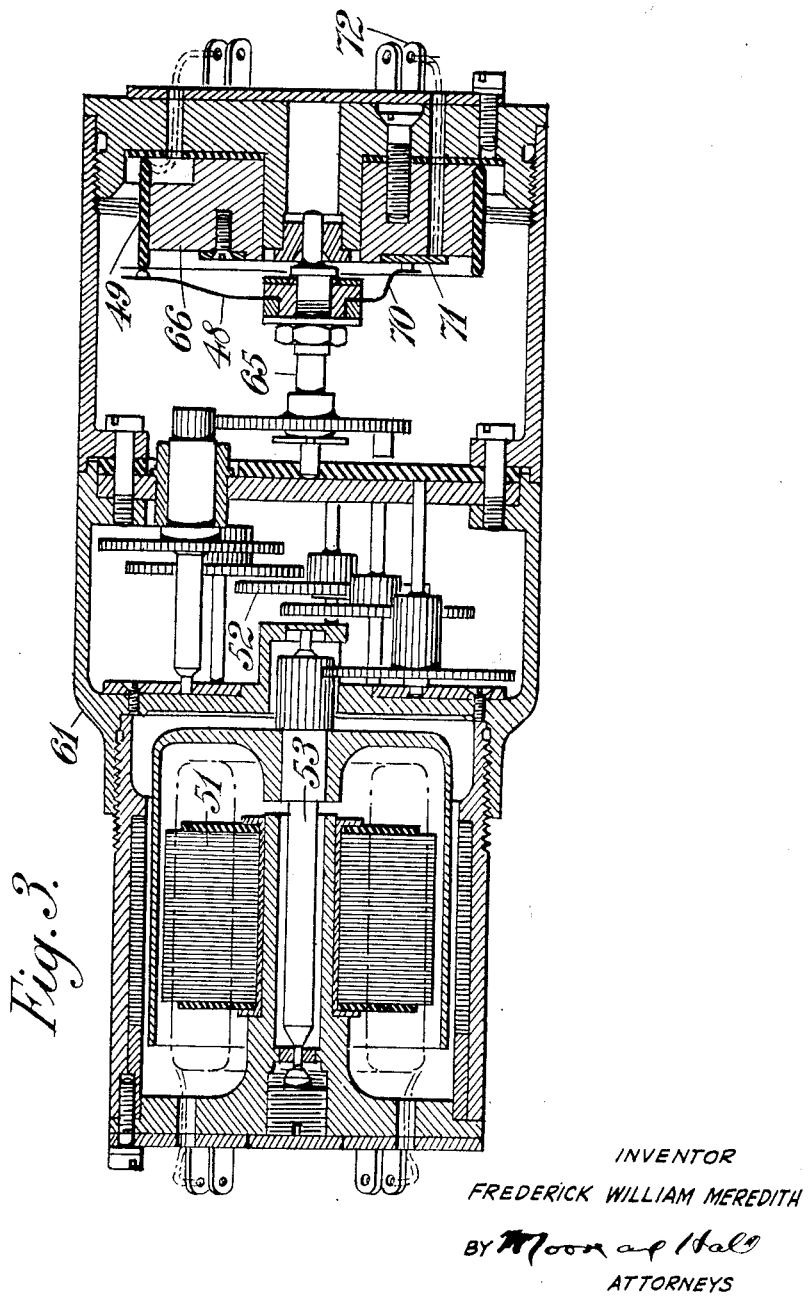

Patented Dec. 2, 1952

2,620,463

UNITED STATES PATENT OFFICE 2,620,463

AUTOMATIC CONTROL SYSTEM

Frederick William Meredith, London, England, assignor to S. Smith & Sons (England) Limited, London, England, a British company Application June 11, 1948, Serial No. 32,503
In Great Britain June 12, 1947

24 Claims. (Cl. 318—489)

This invention relates to automatic control systems for maintaining a condition at a predetermined value by supplying appropriate signals to a servomotor controlling the condition.

The commonest form of such control system is that in which the signals are proportional to the displacement of the condition from the predetermined value and the displacement of the servomotor from a datum position, so that the servomotor comes to rest, assuming that there is no static torque on the motor, when the signals are equal but opposite. If the datum position of the servomotor is consistent with the maintenance of the predetermined condition, the servomotor can come to rest with both signals zero and so maintain the predetermined condition. It may happen, however, that conditions arise in which the datum position of the servomotor is no longer consistent with the maintenance of the predetermined condition. Thus in a system for maintaining an aircraft on a predetermined course the datum position of the servomotor is normally that corresponding to rudder amidships. If, however, one engine of a multi-engined aircraft cuts out it would no longer be possible to maintain the aircraft on any course with the rudder amidships. Consequently the aircraft would settle down on a new course displaced from the original course by an amount corresponding to the necessary rudder displacement. To overcome this difficulty Sir James Henderson has suggested that a signal proportional to the time integral of the displacement from the predetermined condition should also be applied to the servomotor.

The applicant has, however, evolved a control system, one example of which is described in patent application No. 658,614, now Patent No. 2,611,559, in which there is no signal proportional to the displacement of the servomotor applied thereto, although there are signals proportional to the rate of displacement of the servomotor and the rate of change of condition and a monitoring signal proportional to the displacement from the predetermined condition. Therefore such a system is not subject to the difficulties mentioned above, since the servomotor can take up any desired position, and the need for a signal proportional to the time integral of the displacement from the predetermined condition does not arise on that account. It is only such a system as that evolved by the applicants and hereinafter referred to as "of the kind specified" that the present invention relates.

In a control system of the kind specified the device generating a signal proportional to the rate of change of condition and the device generating a signal proportional to the rate of displacement of the servomotor are adjusted to give zero signals when the condition and displacement are not changing. Owing, however, to rough handling or for other reasons it is not always possible to maintain this adjustment with the result that one of the devices may generate a signal when the condition and the displacement are steady. This signal must be balanced by the other signal or signals. If no monitoring signal proportional to the displacement of the condition is provided the condition will vary at a steady rate. If such a monitoring signal is provided the steady state condition will be displaced from the predetermined value. The object of the present invention is to provide a system in which compensation for lack of adjustment is provided.

An automatic control system for maintaining a condition at a predetermined value in which the condition is controlled by signals including a signal in accordance with the rate of change of the condition comprises, according to the present invention, means for providing an additional controlling signal which is dependent on the difference between the time that the condition is displaced from the predetermined value in one direction and the time that it is displaced in the opposite direction and means for controlling said condition in accordance with said signals. This additional signal may be proportional to the integral with respect to time of the displacement of the condition from the predetermined value.

The additional signal is preferably obtained from a device generating a signal in accordance with the displacement of a movable part thereof from a datum position, said moving part being controlled by a motor actuated during such time as the condition is displaced from the predetermined value. The speed of the motor may be controlled in accordance with the displacement of the condition from the predetermined value.

The invention will be more clearly understood from the following description of an automatic control system for stabilising an aircraft about the roll axis, reference being made to the accompanying drawings, in which:

Figure 2 illustrates diagrammatically an alternative form of the system illustrated in Figure 1, and Figure 3 is a detailed cross-sectional view of the integrating motor and potentiometer of Figures 1 and 2.

Figure 1:
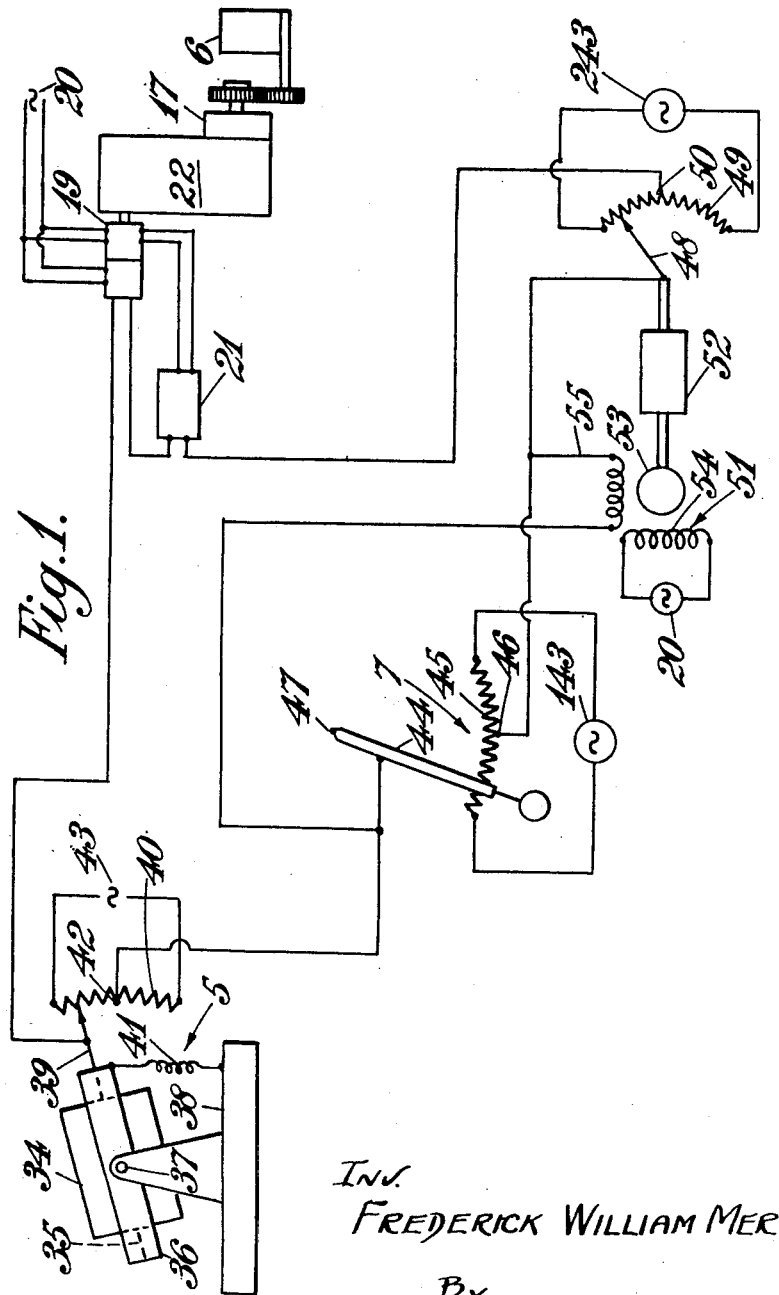
Figure 1 illustrates diagrammatically one form of the layout of the system.

Referring to Figure 1, which shows a modified form of the aileron control system illustrated in Figure 1 of application No. 658,614, the aircraft is stabilised in roll by a rate-of-turn gyroscope indicated at 5. This gyroscope controls the ailerons 6 in a manner to be described and a pendulous bank monitor indicated at 7 ensures that the aircraft is level during straight flight.

The gyroscope 5 comprises a rotor 34 mounted on spin axes 35 in a gimbal ring 36 gimballed about an axis 37 on a fixed base 38. Carried by the gimbal ring 36 is a potentiometer contact 39 arranged to sweep across a fixed arcuate potentiometer resistance 40 as the ring rotates relatively to the base about the axis 37. The ring 36 is restrained by a spring 41 to a central position in which the contact 39 engages the mid point 42 of the resistance 40. The resistance 40 is connected across an A. C. source 43. The electrical output of the gyroscope appears between the contact 39 and the mid-point and is in phase or antiphase with the voltage output of source 43 as contact 39 is at one side or the other of mid-point 42.

In operation any turn about an axis normal to the base 38 results in precession of the gyroscope about the axis 37 against the spring restraint to an extent determined by the rate of turn. Hence the output voltage will be proportional to the rate of turn and will be in phase or antiphase with the voltage output of source 43 as the rate-of-turn is in one sense or the other.

The ailerons 6 are coupled through a clutch 17 and gear-box 18 to an electric hysteresis motor 19 of the kind described in British patent specifications Nos. 576,248 and 576,249. Motor 19 is wound for two phase operation, one phase being coupled to an A. C. source 20, of the same frequency as source 43 but in quadrature therewith, and the other phase, the control phase, being connected to the output of a high-gain amplifier 21. Motor 19 is coupled to a hysteresis generator 22 of the kind described in British patent specification No. 576,351. Generator 22 is also wound for two-phase operation. The input winding is connected to the source 20, so that a voltage proportional to the speed of the generator and therefore to that of the motor and in quadrature with the voltage of source 20, i. e. in phase (or antiphase) with that of source 49 (according to the direction of rotation) is developed in the output winding.

The bank monitor 7 comprises a pendulum 44 of suitable conducting material pivoted to swing about an axis 47 parallel to the roll axis of the aircraft. The pendulum 44 sweeps across an arcuate resistance 45 connected to the A. C. source 43 which is in phase with the A. C. source 43 so that the electrical output appears between the pendulum 44 and the mid-point 46 of the resistance 45. The resistance 45 is arranged so that when the aircraft is level, pendulum 44 is on mid-point 46. Hence when the aircraft deviates in bank from the level, an A. C. signal is generated in the output of the monitor having an amplitude proportional to the angular deviation and in phase or antiphase with source 43 as the deviation is in one direction or the other.

Contact 39 of gyroscope 5 is electrically connected through the output winding of generator 22 to one input terminal of amplifier 21. Midpoint 42 of resistance 40 of gyroscope 5 is electrically connected to pendulum 44 of monitor 7. Mid-point 46 of resistance 45 of monitor 7 is connected to a slider 48 sliding on a potentiometer resistance 49, the mid-point 50 of which is connected to the other input terminal of amplifier 21.

A. C. source 243 which is in phase with A. C. source 43 is connected across potentiometer resistance 49 so that an A. C. voltage is generated between slider 48 and mid point 50 in accordance with the deviation of the slider from the mid point.

Slider 48 is driven over resistance 49 by an electric motor 51 through reduction gearing 52. Motor 51 is of the drag-cup type and comprises a rotor 53, a first winding 54 connected to A. C. source 20 and a second winding 55 connected across the output of monitor 7. Motor 51 then rotates at a rate and in a direction proportional to the A. C. signal from monitor 7 and hence to the angular deviation of the craft in roll. The A. C. signal generated between slider 48 and midpoint 50 of resistance 49 is therefore proportional to the integral with respect to time of the deviation of the craft about the roll axis from the horizontal. Considering now the system as a whole, it will be seen that the algebraic sum of four A. C. signals is applied to the input of amplifier 21. These signals are all of the same frequency and are all either in phase or antiphase with the voltage of source 43. The four signals are proportional respectively to the rate of roll of the aircraft as measured by gyroscope 5, the angular deviation in roll of the aircraft from the horizontal as measured by pendulum 7, the integral with respect to time of the deviation in roll from the horizontal as measured by the integrating potentiometer comprising slider 48 and resistance 50, and the speed of the motor 19 as measured by generator 22. Pendulum 7 and the integrating potentiometer are purely monitors, that is they give comparatively weak signals compared with those derived from gyroscope 5 and generator 22 and their effect on the operation of motor 19 during a disturbance of the aircraft about the roll axis may be neglected. The motor 19 operates to reduce the input to the amplifier and since the gain of the amplifier is made very large it will reduce this input substantially to nothing. That is to say during a disturbance the motor will run at such a speed that the output of the generator 22 is substantially equal but opposite to the output of the rate-of-turn device 5, or in other words the motor 19 and therefore the aileron 6 will be operated at a speed proportional to the rate of roll. This will have the effect of very rapidly stabilising any disturbance in roll. If after the disturbance is stabilised the aircraft is not level in roll, the electrical signal from the roll pendulum 7 will cause the servo-system to be actuated until the pendulum signal is reduced to zero, i. e. the aircraft is level.

So long as the gyroscope 5 and generator 22 are correctly adjusted to give zero signal for zero rates of turn of the aircraft and ailerons respectively, there will be no necessity to provide the integrating potentiometer described. The adjustment of a delicate instrument such as a rate of turn gyroscope can, however, very easily be disturbed, for example during landing of the aircraft, so that it gives a signal when there is no rate of turn. Without the provision of the integrating potentiometer, this signal can only be balanced by the monitoring signal from pendulum 7 and consequently the aircraft will be stabilised in an attitude in roll displaced from the required attitude by an amount sufficient to give the required balancing signal from the monitor 7.

To compensate for such a misadjustment integrating motor 51 and associated potentiometer are provided as described. If the adjustment of gyroscope 5 or generator 22 becomes disturbed so as to cause a displacement in attitude of the aircraft, slider 49 will be displaced from midpoint 50 by an extent proportional to the integral of the displacement and the additional signal applied to the amplifier 21 from the potentiometer will eventually balance the misadjustment signal with the aircraft level about the roll axis.

The system illustrated in Figure 2 is similar in operation to that of Figure 1 and corresponding reference numerals indicate similar components. In this case however, motor 51 is not controlled by monitor 7 but instead is driven at a constant speed forward or in reverse in accordance with the direction of the deviation of the aircraft from the horizontal about the roll axis. The ends of winding 55 of motor 51 are connected to terminals 56, 57 of a mercury switch 58 arranged so that electrical connection between terminals 56 and a third terminal 59 is effected when the aircraft deviates from the horizontal in one direction, and connection between terminal 57 and terminal 59 is effected when the deviation is in the other. When the aircraft is horizontal about the roll axis, terminal 59 is connected to neither of terminals 56, 57. A. C. source 43 is connected between terminal 59 and a centre tapping 60 on winding 55. Winding 54 is supplied with current from source 20 as before.

Motor 51 will rotate at a constant speed as long as the aircraft is not horizontal in roll and in a direction dependent on the sense of the deviation from the horizontal. Hence if a misadjustment signal is given by either gyroscope 5 or generator 22, slider 48 will be moved from mid-point 50 by motor 51 by an amount proportional to the time duration of the resulting deviation until the misadjustment signal is balanced by the signal applied to amplifier 21 from the potentiometer.

While the above description has been restricted to the control of an aircraft about the roll axis, it will be appreciated that the invention is equally applicable to all similar automatic control systems and in particular to the yaw and pitch control system of an aircraft.

Figure 3 illustrates in more detail the integrating device comprising motor 51 and its associated potentiometer of Figures 1 and 2.

A casing 61 contains two phase motor 51 which is of the well-known drag-cup type. The rotor 53 of the motor drives, through a gear-train 52, the spindle 65 carrying the conducting arm 48 engaging with the winding 49 of the potentiometer 66. The conducting arm 48 is insulated from the spindle 65 and connected to a further conducting arm 70 which is in sliding contact with a conductor 71 connected to one of the output terminals 72 of the potentiometer.

I claim:

1. An automatic control system for maintaining a condition at a predetermined value comprising means for generating an electric signal of a magnitude dependent on the rate of change of the condition; means for generating an electric deviation signal dependent on the deviation of the condition from the predetermined value; an electric motor, the speed of which is controlled by said deviation signal; an electric pick off, the moving part thereof being driven by said motor; an amplifier to the input of which are applied the rate of change signal, the deviation signal and the signal from said pick off; an electric servomotor controlling the condition and controlled by the output from said amplifier; an electric generator, the output of which is proportional to the speed at which it is driven, coupled to said motor; and means for applying the output of said generator to the input of said amplifier.

2. An automatic control system for maintaining a condition at a predetermined value comprising means for generating an electric signal in accordance with the rate of change of the condition; means for generating an electric deviation signal dependent on the deviation of the condition from the predetermined value; an electric motor driven at constant speed in a direction dependent on the sense of the deviation of the condition from the predetermined value; an electric pick off the moving part thereof being driven by said motor; and an electric servomotor controlling the condition, the speed of said servomotor being substantially proportional to the algebraic sum of the rate of change signal, the deviation signal and the signal from the said pick off.

3. An automatic control system for maintaining a condition at a predetermined value comprising means for generating an electric signal in accordance with the rate of change of the condition; means for generating an electric deviation signal dependent on the deviation of the condition from the predetermined value; an electric motor driven at constant speed in a direction dependent on the sense of deviation of the condition from the predetermined value; an electric pick off, the moving part thereof being driven by said motor; an amplifier to the input of which are applied the rate of change signal, the deviation signal and the signal from said pick off; an electric servomotor controlling the condition and controlled by the output from said amplifier; an electric generator, the electrical output from which is proportional to the speed at which it is driven, coupled to said servo motor; and means for applying the electrical output from said generator to the input of said amplifier.

4. An automatic control system for maintaining an aircraft at a predetermined attitude about one of the axes thereof comprising means for generating a signal in accordance with the rate of turn of the aircraft about said axis, means for generating a signal in accordance with the deviation of the aircraft from the predetermined attitude, a motor whose direction of rotation is dependent upon the direction of the elevation of the aircraft from its predetermined attitude about the control axis, said motor driving a pick-off to provide a signal dependent on the difference between the time that the aircraft is displaced from the predetermined attitude in one direction and the time that it is displaced in the opposite direction, a servomotor controlling the appropriate control surfaces of the aircraft, a tachometric signal generator to give a signal proportional to the rate of movement of said servomotor and an amplifier whose output controls said servomotor and to whose input are applied the aforementioned signals to cause the speed of the servomotor to be controlled by the signals in accordance with rate of turn of the craft, deviation of the craft from a predetermined attitude and pick-off displacement.

5. An automatic control system for maintaining an aircraft at a predetermined attitude about one of the axes thereof, comprising means for generating an electric signal proportional to the rate of turn of the aircraft about the axis, an electric motor whose direction of rotation is dependent upon the direction of the deviation of the aircraft from its predetermined attitude, a device generating an electric signal in accordance with the displacement of a moving part thereof from a datum position, said moving part being displaced by said electric motor, an electric servomotor controlling the appropriate control surface of the craft, an electric tachometric signal generator to give a signal proportional to the rate of movement of said servomotor and an electric amplifier whose output controls said servomotor and to whose input are applied the aforementioned signals to cause the speed of the servomotor to be controlled in accordance with rate of turn signal, the deviation signal and the signal from said device, said servomotor controlling the appropriate control surface of the aircraft.

6. An automatic control system for maintaining an aircraft at a predetermined attitude about one of the axes thereof as claimed in claim 5 comprising also means for generating an electric signal in accordance with deviation of the aircraft from the predetermined attitude about the axis, said signal also being applied to the input of the amplifier.

7. An automatic control system for maintaining an aircraft at a predetermined attitude about one of the axes thereof as claimed in claim 5 wherein the motor driving the displaceable part runs at a constant speed in a direction dependent on the sense of deviation of the aircraft from the predetermined attitude.

8. An automatic control system for maintaining an aircraft at a predetermined attitude about one of the axes thereof comprising a rate of turn gyroscope generating an electric A. C. signal proportional to the rate of turn of the aircraft about said axis; a pendulum mounted about an axis parallel to said axis and forming the contact arm of an A. C. potentiometer, whereby a deviation signal proportional to the deviation of the aircraft from the predetermined attitude is produced; an electric motor, the speed of which is controlled by said deviation signal; an A. C. pick off, the moving part thereof being coupled through reduction gearing to said motor, producing an A. C. signal proportional to the integral with respect to time of the deviation of the craft from the predetermined attitude; an amplifier, to the input of which are applied the rate of turn signal, the deviation signal and the integral signal; an electric servo-motor controlled by the output from said amplifier and controlling the appropriate control surfaces of the aircraft; an electric generator, the output from which is proportional to the rate at which it is driven coupled to said servo-motor; and means for applying the output from said generator to the input of said amplifier in phase opposition to the controlling signals applied thereto.

9. An automatic control system for maintaining a condition at predetermined value comprising means for generating a signal in accordance with the rate of change of the condition, a motor whose direction of rotation is dependent upon the direction of the deviation of the condition from the predetermined value, said motor driving a pick-off to provide a signal dependent on the difference between the time that the condition is displaced from the predetermined value in one direction and the time it is displaced from the predetermined value in the other direction, a servomotor controlling the condition, a tachometric signal generator to give a signal proportional to the rate of movement of said servomotor and an amplifier whose output controls said servomotor and to whose input are applied the aforementioned signals to cause the speed of the servomotor to be controlled by the signals in accordance with rate of change of condition and from the pick off.

10. An automatic control system for maintaining a condition at a predetermined value comprising means for generating a signal in accordance with the rate of change of the condition, means for generating a signal in accordance with the deviation of the condition from the predetermined value, a motor having a direction of rotation dependent upon the direction of the deviation of the condition from the predetermined value, said motor driving a pick-off to provide a signal dependent on the difference between the time that the condition is displaced from the predetermined value in one direction and the time that it is displaced from the predetermined value in the other direction, a servomotor controlling the condition and a tachometric signal generator to give a signal proportional to the rate of movement of said servomotor and an amplifier whose output controls said servomotor and to whose input are applied the aforementioned signals to cause the speed of the servomotor to be controlled by the signals in accordance with rate of change of condition, the deviation of the condition and the signal from the pick-off device.

11. An automatic control system for maintaining a condition at a predetermined value comprising a servomotor controlling the condition, an amplifier whose output supplies said motor, means for generating a first signal in accordance with the rate of change of the condition, means for generating a second signal in accordance with the rate of rotation of the servomotor, said first and second signals being applied to the amplifier input to cause the aforesaid motor to run at a speed substantially proportional to the rate of change of the condition, a motor whose direction of rotation is dependent upon the direction of the deviation of the condition from the predetermined value, said motor driving a pick-off to provide a third signal dependent upon the difference between the time that the condition is displaced from the predetermined value in one direction and the time that it is displaced in the opposite direction from the predetermined value, said third signal being also fed to the amplifier input.

12. An automatic control system for maintaining a condition at a predetermined value comprising a servomotor controlling the condition, an amplifier whose output supplies said motor, means for generating a first signal in accordance with the rate of change of the condition, means for generating a second signal in accordance with the rate of rotation of the servomotor, said first and second signals being applied to the amplifier input to cause the aforesaid motor to run at a speed substantially proportional to the rate of change of the condition, a motor having a direction of rotation dependent upon the direction of the deviation of the condition from the predetermined value, said motor driving a pick-off to provide a third signal dependent upon the difference between the time that the condition is displaced from the predetermined value in one direction and the time that it is displaced from the predetermined value in the opposite direction, and means for generating a fourth signal in accordance with the displacement of the condition from its datum value, said third and fourth signals being also fed to the amplifier input.

13. An automatic control system as claimed in claim 11 in which the third signal is in accordance with the integral with respect to time of the displacement of the condition from the predetermined value.

14. An automatic control system as claimed in claim 11 in which the third signal is proportional to the difference between the time for which the condition is displaced from the datum value in one direction and the time for which it is displaced from the datum value in the opposite direction.

15. An automatic control system as claimed in claim 12 in which the third signal is in accordance with the integral with respect to time of the displacement of the condition from the predetermined value.

16. An automatic control system as claimed in claim 12 in which the third signal is proportional to the difference between the time for which the condition is displaced from the datum value in one direction and the time for which it is displaced from the datum value in the opposite direction.

17. An automatic control system for maintaining an aircraft in a predetermined attitude about one of its control axes comprising an electric servomotor actuating the appropriate control surface for control about the axis, an electric amplifier whose output supplies said motor, a rate of turn device generating a first electric signal in accordance with the rate of turn of the aircraft about the control axis, a tachometric generator driven by the servomotor and generating a second electric signal in accordance with the rate of rotation of the servomotor, said first and second signals being applied to the amplifier input to cause the aforesaid servomotor to run at a speed substantially proportional to the rate of turn of the aircraft, an electric motor whose direction of rotation is dependent upon the direction of the deviation of the aircraft from its predetermined attitude about the control axis, said electric motor driving a pick-off to provide a third electric signal, and said third electric signal being applied to the amplifier input.

18. An automatic control system for maintaining an aircraft in a predetermined attitude about one of its control axes comprising an electric servomotor actuating the appropriate control surfaces for control about the axis, an electric amplifier whose output supplies the said motor, a rate of turn device generating a first electric signal in accordance with the rate of turn of the aircraft about the control axes, a tachometric generator driven by the servomotor and generating a second electric signal in accordance with the rate of rotation of the servomotor, said first and second signals being applied to the amplifier input to cause the aforesaid servomotor to run at a speed substantially proportional to the rate of turn of the aircraft, an electric motor whose direction of rotation is dependent upon the direction of the deviation of the aircraft from its predetermined attitude about the control axis, said electric motor driving a pick-off to provide a third electric signal, and a monitor to provide a fourth electric signal in accordance with the deviation of the aircraft from its predetermined attitude about the control axis, said third and fourth signals being fed to the amplifier input.

19. An automatic control system as claimed in claim 17 in which the electric motor driving the pick-off rotates at a speed substantially proportional to the deviation of the craft from its predetermined attitude about the control axis.

20. An automatic control system as claimed in claim 17 in which the electric motor driving the pick-off rotates at a constant speed, its direction of rotation depending upon the direction of the deviation of the craft from its predetermined attitude about the control axis.

21. An automatic control system as claimed in claim 18 in which the electric motor driving the pick-off rotates at a speed substantially proportional to the deviation of the craft from its predetermined attitude about the control axis.

22. An automatic control system as claimed in claim 18 in which the electric motor driving the pick-off rotates at a constant speed, its direction of rotation depending upon the direction of the deviation of the craft from its predetermined attitude about the control axis.

23. In combination in an automatic control system for maintaining an aircraft in a predetermined attitude about one of its control axes comprising an electric servomotor, a control surface operatively connected to said motor for control of an aircraft about an axis, an electric amplifier connected to said servomotor, a rate-of-turn device generating an electric signal which is a function of the rate-of-turn of the craft about said axis, a tachometric generator driven by the servomotor and generating a second electric signal which is a function of the rate of rotation of said servomotor, means to apply both said electric signals to the input of said amplifier to cause said servomotor to run at a speed substantially proportional to the rate-of-turn of the aircraft about said axis whereby to adjust said control surface.

24. In combination in an automatic control system for maintaining an aircraft in a predetermined attitude about one of its control axes comprising an electric servomotor, a control surface operatively connected to said servomotor for control of an aircraft about an axis, an electric amplifier connected to said servomotor, a rate-of-turn device for generating an electric signal which is a function of the rate-of-turn of the craft about said axis, a tachometric generator driven by the servomotor for generating a second electric signal which is a function of the rate of rotation of said servomotor, means to apply both said electric signals to the input of said amplifier to cause said servomotor to run at a speed substantially proportional to the rate-of-turn of the aircraft about said axis whereby to adjust control surface, a motor having a direction of rotation dependent upon the direction of deviation of the craft from a predetermined attitude about said axis, signal producing means controlled by said last named motor and connected to the input of said amplifier for control of said servomotor.

FREDERICK WILLIAM MEREDITH.

REFERENCES CITED

The following references are of record in the file of this patent:

UNITED STATES PATENTS

| Number | Name | Date |
|---|---|---|
| 1,065,656 | Benni | June 24, 1913 |
| 1,436,280 | Minorsky | Nov. 21, 1922 |
| 1,958,258 | Alexanderson | May 8, 1934 |
| 1,966,170 | Greene | July 10, 1934 |
| 2,115,086 | Riggs | Apr. 26, 1938 |
| 2,270,875 | Hanson et al. | Jan. 27, 1942 |
| 2,361,790 | Noxon | Oct. 31, 1944 |
| 2,371,388 | Glenny | Mar. 13, 1945 |
| 2,408,813 | Riggs | Oct. 8, 1946 |
| 2,429,642 | Newton | Oct. 28, 1947 |
| 2,450,907 | Newton et al. | Oct. 12, 1948 |